(12) United States Patent
Mills et al.

(10) Patent No.: US 7,024,386 B1
(45) Date of Patent: Apr. 4, 2006

(54) CREDIT HANDLING IN AN ANONYMOUS TRADING SYSTEM

(75) Inventors: Gregory D. Mills, Flanders, NJ (US); Bob Walder, Oradell, NJ (US)

(73) Assignee: EBS Group Limited, (GB)

( * ) Notice: Subject to any disclaimer, the term of this patent is extended or adjusted under 35 U.S.C. 154(b) by 559 days.

(21) Appl. No.: 09/603,514

(22) Filed: Jun. 23, 2000

(51) Int. Cl.
*G06F 17/60* (2006.01)

(52) U.S. Cl. .............................. 705/37; 705/35; 705/38; 705/39

(58) Field of Classification Search ................ 705/37, 705/38, 35, 39
See application file for complete search history.

(56) References Cited

U.S. PATENT DOCUMENTS

| | | |
|---|---|---|
| 3,823,387 A | 7/1974 | McClellan |
| 4,388,489 A | 6/1983 | Wigan et al. |
| 4,525,779 A | 6/1985 | Davids et al. |
| 4,531,184 A | 7/1985 | Wigan et al. |
| 4,554,418 A | 11/1985 | Toy |
| 4,555,781 A | 11/1985 | Baldry et al. |
| 4,598,367 A | 7/1986 | DeFrancesco et al. |
| 4,623,964 A | 11/1986 | Getz et al. |
| 4,750,135 A | 6/1988 | Boilen |
| 4,815,030 A | 3/1989 | Cross et al. |
| 4,942,616 A * | 7/1990 | Linstroth et al. ......... 705/36 R |
| 5,003,473 A | 3/1991 | Richards |
| 5,034,916 A | 7/1991 | Ordish |
| 5,038,284 A * | 8/1991 | Kramer ....................... 705/37 |
| 5,077,665 A | 12/1991 | Silverman et al. |
| 5,136,501 A * | 8/1992 | Silverman .................. 364/408 |
| 5,195,031 A | 3/1993 | Ordish |
| 5,230,048 A | 7/1993 | Moy |
| 5,257,369 A | 10/1993 | Skeen et al. |
| 5,258,908 A | 11/1993 | Hartheimer et al. |
| 5,267,148 A | 11/1993 | Kosaka et al. |
| 5,270,922 A | 12/1993 | Higgins |
| 5,287,787 A | 2/1994 | Inoue |
| 5,289,578 A | 2/1994 | Hartheimer et al. |
| 5,305,200 A | 4/1994 | Hartheimer et al. |
| 5,375,055 A | 12/1994 | Togher et al. |
| 5,508,913 A | 4/1996 | Yamamoto et al. |
| 5,557,780 A | 9/1996 | Edwards et al. |
| 5,557,798 A | 9/1996 | Skeen et al. |
| 5,615,269 A | 3/1997 | Micali |
| 5,710,889 A | 1/1998 | Clark et al. |
| 5,727,165 A | 3/1998 | Ordish et al. |
| 5,787,402 A | 7/1998 | Potter et al. |

(Continued)

FOREIGN PATENT DOCUMENTS

EP 0453150 A2 * 4/1991

(Continued)

OTHER PUBLICATIONS

U.K. Search Report issued Feb. 16, 2001 (in English).

(Continued)

*Primary Examiner*—Ella Colbert
(74) *Attorney, Agent, or Firm*—Dickstein, Shapiro, Morin & Oshinsky, LLP.

(57) ABSTRACT

In an anonymous trading system, credit between counterparties is effectively increased by netting buy and sell trades to reflect the true risk to which each party is exposed. Credit limits are adjusted by calculating the exposure in each currency at the relevant time and then converted into the credit limit currency equivalent. The credit limits are adjusted accordingly. The resulting credit limits may be different for bids and offers by or from a given counterparty.

64 Claims, 10 Drawing Sheets

U.S. PATENT DOCUMENTS

| | | | |
|---|---|---|---|
| 5,802,499 A | 9/1998 | Sampson et al. | |
| 5,806,050 A | 9/1998 | Shinn et al. | |
| 5,809,483 A | 9/1998 | Broka et al. | |
| 5,815,665 A | 9/1998 | Teper et al. | |
| 5,864,827 A | 1/1999 | Wilson | |
| 5,870,544 A | 2/1999 | Curtis | |
| 5,890,140 A | 3/1999 | Clark et al. | |
| 5,905,248 A | 5/1999 | Russell et al. | |
| 5,905,974 A | 5/1999 | Fraser et al. | |
| 5,909,545 A | 6/1999 | Frese, II et al. | |
| 5,915,209 A | 6/1999 | Lawrence | |
| 5,924,082 A | 7/1999 | Silverman et al. | |
| 5,924,083 A * | 7/1999 | Silverman | 705/37 |
| 5,966,531 A | 10/1999 | Skeen et al. | |
| 5,978,485 A | 11/1999 | Rosen | |
| 6,014,627 A | 1/2000 | Togher et al. | |
| 6,151,588 A * | 11/2000 | Tozzoli et al. | 705/37 |
| 6,282,521 B1 * | 8/2001 | Howorka | 705/37 |
| 6,317,727 B1 * | 11/2001 | May | 705/37 |
| 6,343,278 B1 | 1/2002 | Jain et al. | |

FOREIGN PATENT DOCUMENTS

| | | |
|---|---|---|
| EP | 0434224 | 6/1991 |
| EP | 0485252 | 5/1992 |
| EP | 0512702 | 11/1992 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 1489574 | 10/1977 |
| GB | 2165421 | 4/1986 |
| GB | 2180380 | 3/1987 |
| GB | 2210714 | 6/1989 |
| GB | 2282246 | 3/1995 |
| GB | 2325130 | 11/1998 |
| GB | 2326256 | 12/1998 |
| WO | 90/02382 | 3/1990 |
| WO | 92/07324 | 4/1992 |
| WO | 92/15174 | 9/1992 |
| WO | 93/15467 | 8/1993 |
| WO | WO 93/15467 | 8/1993 |
| WO | 94/15294 | 7/1994 |
| WO | 95/06918 | 3/1995 |
| WO | 95/18418 | 7/1995 |
| WO | 95/30211 | 11/1995 |
| WO | 96/18963 | 6/1996 |
| WO | 96/34357 | 10/1996 |
| WO | 97/22072 | 6/1997 |
| WO | 97/24833 | 7/1997 |
| WO | 97/31322 | 8/1997 |
| WO | 97/33215 | 9/1997 |
| WO | 97/36253 | 10/1997 |
| WO | 97/43727 | 11/1997 |
| WO | 97/45802 | 12/1997 |
| WO | 97/49050 | 12/1997 |
| WO | 98/05011 | 2/1998 |
| WO | 98/13796 | 4/1998 |
| WO | 98/21667 | 5/1998 |
| WO | 98/24041 | 6/1998 |
| WO | 98/26344 | 6/1998 |
| WO | 98/26363 | 6/1998 |
| WO | 98/36456 | 8/1998 |
| WO | 98/38558 | 9/1998 |
| WO | 98/47268 | 10/1998 |
| WO | 98/49635 | 11/1998 |
| WO | 98/49639 | 11/1998 |
| WO | 98/53581 | 11/1998 |
| WO | 99/01983 | 1/1999 |
| WO | 99/08419 | 2/1999 |
| WO | 99/10795 | 3/1999 |
| WO | 99/10815 | 3/1999 |
| WO | 99/14695 | 3/1999 |
| WO | 99/19821 | 4/1999 |
| WO | 99/27477 | 6/1999 |
| WO | 99/33242 | 7/1999 |
| WO | 99/35583 | 7/1999 |
| WO | 99/36875 | 7/1999 |
| WO | 99/40502 | 8/1999 |
| WO | 99/41690 | 8/1999 |
| WO | 99/50771 | 10/1999 |
| WO | 00/16224 | 3/2000 |
| WO | WO 0/150329 A2 | 7/2001 |

OTHER PUBLICATIONS

Mini Computer forum, Conference Proceedings, 1975.
Wall Street Computer Review, 1998.
Computers in the City, Conference Proceedings, 1988.
Banking Technology, 1988, vol. 5, No. 5.

* cited by examiner

| BANK A: | EUR | USD |
|---|---|---|
| Trade 1 | 10.00M | (10.70M) |
| Trade 2 | (10.00M) | 10.80M |
| Exposure | 0 | 0.1M |

Figure 9

BANK A:

| | EUR | JPY | USD |
|---|---|---|---|
| Trade 1 | 10.00M | | (10.70M) |
| Trade 2 | (10.00M) | 1,250M | |
| Exposure | 0 | USD 10,593,200 at JPY/USD118 | (10.70M) = 0 |

Figure 10

| Currency Pairs | Conversion Rates |
|---|---|
| EUR/USD | 1.0700 |
| EUR/JPY | 125.00 |
| JPY/USD | 118.00 |
| USD/USD | 1.0000 |

| Credit Limit Currency | Credit Limit |
|---|---|
| USD | 10.00 |

|  | EUR | JPY | USD | Netted Exposure |
|---|---|---|---|---|
|  | 10.00 (10.00) | 1,250.00 (2,360.00) | (10.70) 20.00 |  |
| Total | - | (1,110.00) | 9.30 |  |
| CLC Equiv | - | (9.41) | 9.30 | 9.30 |

Figure 11

Bank A:

| Credit Limit (USD) | Deal Amount (USD) | Credit Available |
|---|---|---|
| 50M | 10.7M | 39.3M |
| 50M | 10.8M | 28.5M |

Figure 12

CREDIT HANDLING IN AN ANONYMOUS TRADING SYSTEM

FIELD OF THE INVENTION

This invention relates to electronic brokerage systems and in particular to systems in which counterparties trade anonymously within fixed credit limits. Such systems may trade financial instruments such as foreign exchange and forward rate agreements. The invention is particularly concerned with the handling of credit limits.

BACKGROUND TO THE INVENTION

A number of anonymous trading systems are known in the art. EP-A-0,399,850, EP-A-0,406,026 and EP-A-0,411,748 all assigned to Reuters Ltd disclose aspects of an automated matching system in which a host computer maintains a central database of bids and offers submitted by terminals connected to the host via a network. The host also maintains records of credit limits between each trading bank and the possible counterparties with which it is willing to trade. The host computer uses information in its central database to match bids and offers and buy and sell orders based on matching criteria which include the counter party credit limits.

Generally, counterparty credit limits are set for each bank or each trading floor and the host computer establishes a gross counter party credit limit for each possible pair of counterparties. The gross counter party credit limit is the minimum amount of remaining credit between two counterparties.

A trader's terminal will display a subset of the trading book, typically the best few bids and offers. These will be updated periodically to ensure that the trader sees the true state of the market.

A problem with the system outlined above is that the trader sees the bids and offers irrespective of whether he has sufficient credit with the counter party submitting that bid or offer to trade. As a result, a trader can attempt to trade when there is no available credit. As the system is anonymous the trader has no knowledge of the counterparty until a trade as been completed and so, when he hits a bid or offer, has no idea as to whether it is likely to be accepted or rejected for lack of credit. This is extremely frustrating for a trader, particularly in a fast moving market in which trading opportunities can easily be lost. The problem arises as the host computer only checks available credit after a deal has been proposed and a potential match identified.

This problem was solved in WO93/15467 now assigned to EBS Dealing Resources inc. Instead of displaying the actual trading book, or a part of it, to each trader, a different market view is shown to each trader in which bids and offers from counterparties which whom they have insufficient or no credit are screened out. Thus, the trader only sees prices with which he knows he can deal.

The architecture of the system of WO93/15467 is very different from the of the Reuters system and is based on a distributed network with a number of arbitrators which perform matching. Actual credit limits are stored at local bank nodes to which each of a bank's trading terminals are connected ensuring that sensitive credit data does not leave the bank's physical site. The actual trading book is sent by the arbitrators to the market distributor. The market distributor forms a market view specific to a given trading floor and sends it to the relevant bank node. A different market view may be formed for each trading floor depending on credit criteria. Thus, the market view which is distributed to each of the bank nodes is the complete market view with credit screening taking place, the market distributor to filter out any prices with which the bank, or a given trading floor within the bank, has insufficient credit.

In addition, the market distributers also have limited credit information, maintaining a credit matrix which may store a simple "yes-no" credit indicator for given counterparties. When a match is made, the prices having already been screened for credit, the bank node will make a second credit check using the credit matrix to see whether any previously extended credit has already been exhausted.

While both the above systems have been used successfully in the financial trading markets for a number of years, they both suffer from the disadvantage that they require banks to tie up large amounts of credit in one area of their trading activities. A typical bank will be trading a number of financial instruments and a number of different markets and will want to trade up to its credit limits in each trading day. If one particular market is quiet it will want to be able to divert the credit assigned to that market to a different field. Similarly, if a particular market is very active it will want to be able to take advantage of that activity. It is desirable therefore, to minimise the amount of credit tied up and for it to reflect the actual exposure of the invention.

SUMMARY OF THE INVENTION

The invention aims to overcome this disadvantage by reducing the amount of credit that need be maintained in the anonymous trading system, and in its broadest form provides for the netting of trades between counterparties. Thus, if a party sells an amount to a counterparty and later buys from the counterparty, the available credit of each party with the other is decremented only by the difference between the trades or the net trade.

The invention provides an anonymous trading system for trading financial instruments between traders for storing credit limits available for trades between each trader or group of traders and possible counterparty traders or groups of traders and credit adjustment means for adjusting the credit available between a given party and a counterparty following a trade with that counterparty, the credit adjustment means calculating the change in exposure to the party resulting from the trade and adjusting the credit limits accordingly, whereby trades between a given trader and each counterparty are netted.

Embodiments of the invention have the advantage that the amount of credit that must be allocated specifically to an anonymous trading system by a bank may be reduced without reducing the dealing capacity. This means that more credit is available to the bank for allocation to other trading areas and so the overall trading capacity can be increased without varying credit limits.

Embodiments of the invention also have the advantage that the netting of credit more closely resembles the actual risk to which a bank is exposed. In the prior art, a sale of $A followed by a purchase of $B from the same counterparty would have reduced the credit available with that counterparty by $A–B which equals the actual amount of risk to which one party is exposed if the other should default.

Preferably, the order input means, for example trader terminals for a given trading floor are connected to a Trading Agent node connected to the communications network, wherein the credit limit storage means and the credit adjustment means for a given trading floor are resident at the trading agent node to which the trading floor is attached.

In each embodiment of the invention, one of a number of netting regimes may be adopted. A given party may designate a given counterparty or counterparties as netting credit groups. Netting may be performed on a per instrument basis or on a cross instrument basis.

Netting may be by settlement date, by time bucket or by total credit exposure.

In one embodiment of the invention, netting is by settlement date. Each netted currency exposure is calculated and then converted into the credit limit base currency equivalent if necessary. If the exposure is negative, meaning that the party owes the currency, then the exposure is considered to be zero if netting is on a per instrument basis. Positive credit limit currency equivalent amounts are added together to give the total credit utilisation for that value date for that instrument.

In a further preferred embodiment, settlement date netting is applied on a cross instrument basis. Exposures are calculated in the same manner as the per instrument basis above but a negative exposure is only considered to be zero if the sum of all the exposures across all the instruments is negative.

Instead of netting on the basis of a specific settlement day when there is a delivery of currency for value on that date, netting may be performed within a specific floor-defined time bucket. Any trade performed within that bucket is included in the currency exposure calculations. Netting by time bucket may be formed on a cross instrument basis.

In one preferred embodiment of the invention netting is performed irrespective of trade date according to the total credit exposure. This may be performed either on a per instrument or cross instrument basis.

BRIEF DESCRIPTION OF THE DRAWINGS

An embodiment of the invention will now be described, by way of example only, and with reference to the accompanying drawings, in which:

FIG. 9 is a simple example of how credit exposure is calculated according to the invention;

FIG. 10 is a more complex example of how credit exposure is calculated according to the present invention;

FIG. 11 is an example of how price distribution is varied as a result of netted trades; and FIG. 12 shows the effect on credit limits of the trades of FIG. 9 calculated by the prior art method.

DESCRIPTION OF PREFERRED EMBODIMENT

The present invention will be described with reference to the dealing architecture illustrated in FIGS. 1 to 6 and which will be hereinafter described. However, it should be understood that the invention is not limited to that architecture but could be implemented in any anonymous trading system. For example, it could be implemented on either of the Reuters and EBS Dealing Resources prior art systems known in the art and referred to earlier.

The electronic brokerage system to be described provides a platform for trading at least the following instruments: FX (Foreign Exchange) Spot, FRA's, and Forwards and also FX Forwards, CFDs, short-dated government and/or central bank paper, commercial bills, CDs, inter-bank deposits, commercial paper, repos, interest-rate futures, swaps, options and a miscellany of tailor-made variants on these basic products. These are all referred to as financial instruments. It may also be used for trading non-financial products such as commodities.

Traders at trader terminals are connected to a communications network which allows electronic messages to be passed between terminals, submit quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell order submitted by a trader wishing to create a deal on the basis of a price displayed on his market view derived from one or more quotes. Hits are orders which are invisible to other traders.

Figure 1:
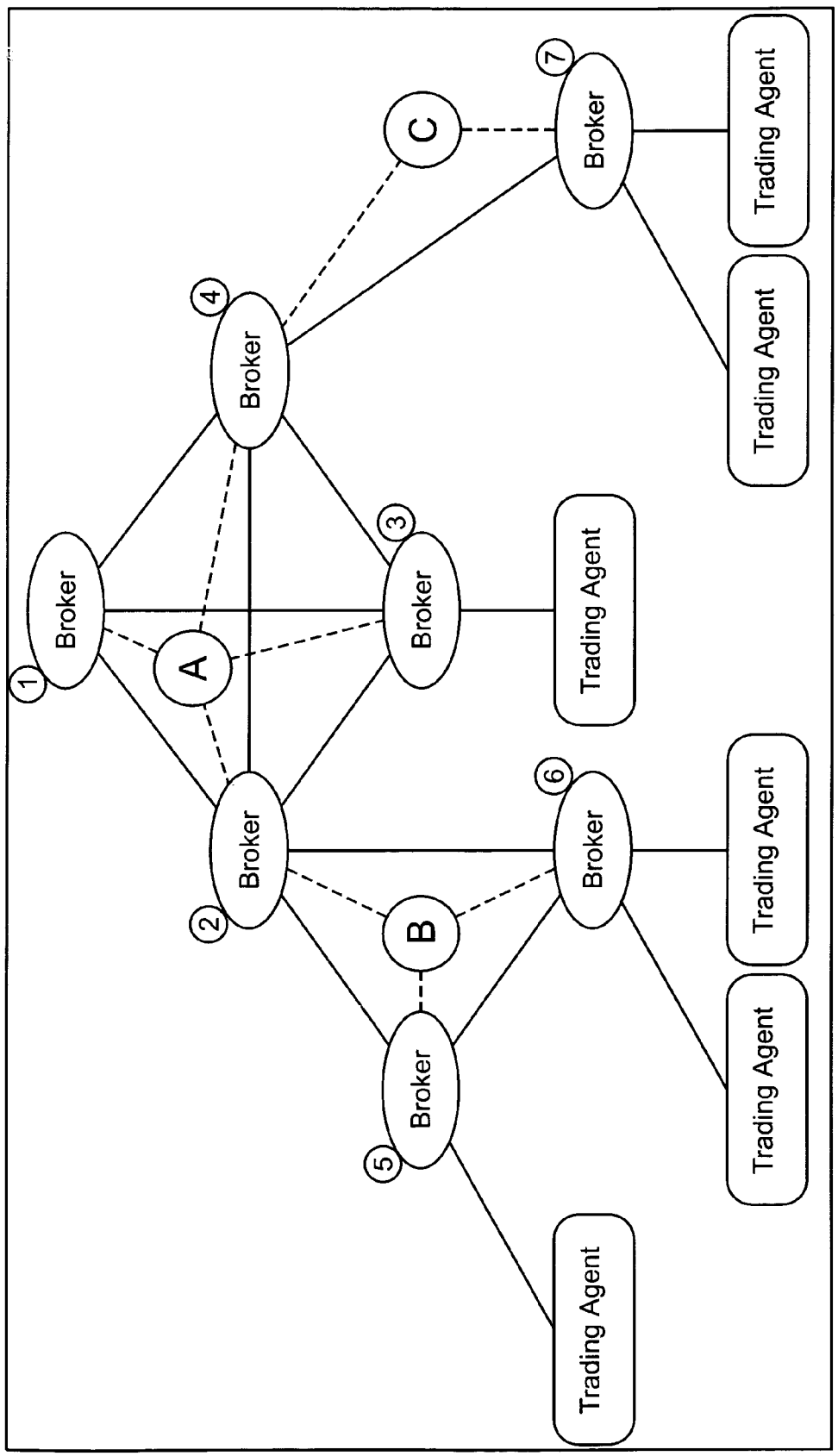
FIG. 1 is an overview of a trading system embodying the invention.

The computer trading system of FIG. 1 comprises a plurality of trading agents 10 each connected to at least one of a plurality of broker nodes 12. Each trading agent is the means by which the trader terminals access the trading system with a given trader terminal being attached to one or more trading agents.

Trader terminals (not shown) may be workstations or other computer terminals configured to generate and submit electronic price quotation messages including bid and/or offer prices, quotes and orders (usually through use of a specialised key pad) and to communicate market view data, including price and amount available, for financial instruments to be traded. The communication is usually by display but could also be by printing the information, voice synthesis or otherwise. The trader terminals are one example of order input devices. Orders may be input manually by traders or automatically, for example by pre-programmed instruction to submit an order for when the market reaches a certain condition.

Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) that the traders can see that reflect the market. The market views are preferably pre-screened for credit compatibility, as described in WO/93/15467. Thus, traders only see displayed quotes with which they can trade. As well as extending credit to a trading floor, credit may be extended to a bank as a whole (many banks have several trading floors in different locations), or to groups of trading floors.

The system is an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbor Brokers. Communication between Brokers is on an equal level, with no "up" or "down" direction in the network.

In the embodiment of FIG. 1, there are three Cliques: that formed by brokers 12a, 12b and 12c, that formed by brokers 12b, 12d, 12e and 12f and that formed by brokers 12e and 12f. It will be seen that brokers 12b and 12e are both in two Cliques.

While Trading Agents must be connected to at least one Broker node, they are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

Thus, the broker nodes each provide a matching engine which is connected to the network for matching submitted bids and offers and, when a match is made, for executing deals. They also perform the function of market distributors distributing price messages to the trader terminals in response to the price quotation messages and the matching engine. Thus, brokers distribute prices to create market views which are aggregations of quotes in the order book. Within the context of the present invention it is preferred that the matching and market distribution functions are amalgamated in the broking node but the invention is equally applicable to systems in which the functions are separate and performed at geographically and/or logically separate locations. An example of such a system is WO93/15467 referred to earlier.

The Broker nodes are equal to each other, and perform the same functions. The arrangement of the network or their position in it is transparent to the broker nodes. They only need to know about their neighbours. Each Broker node has knowledge of all orders in the market, and is able to match orders as soon as they are submitted. As each Broker node maintains a full list of orders in the market, it is therefore able to customize market views as needed by the Trading Agents and is able to react faster to market information as soon as it is received.

Figure 2:
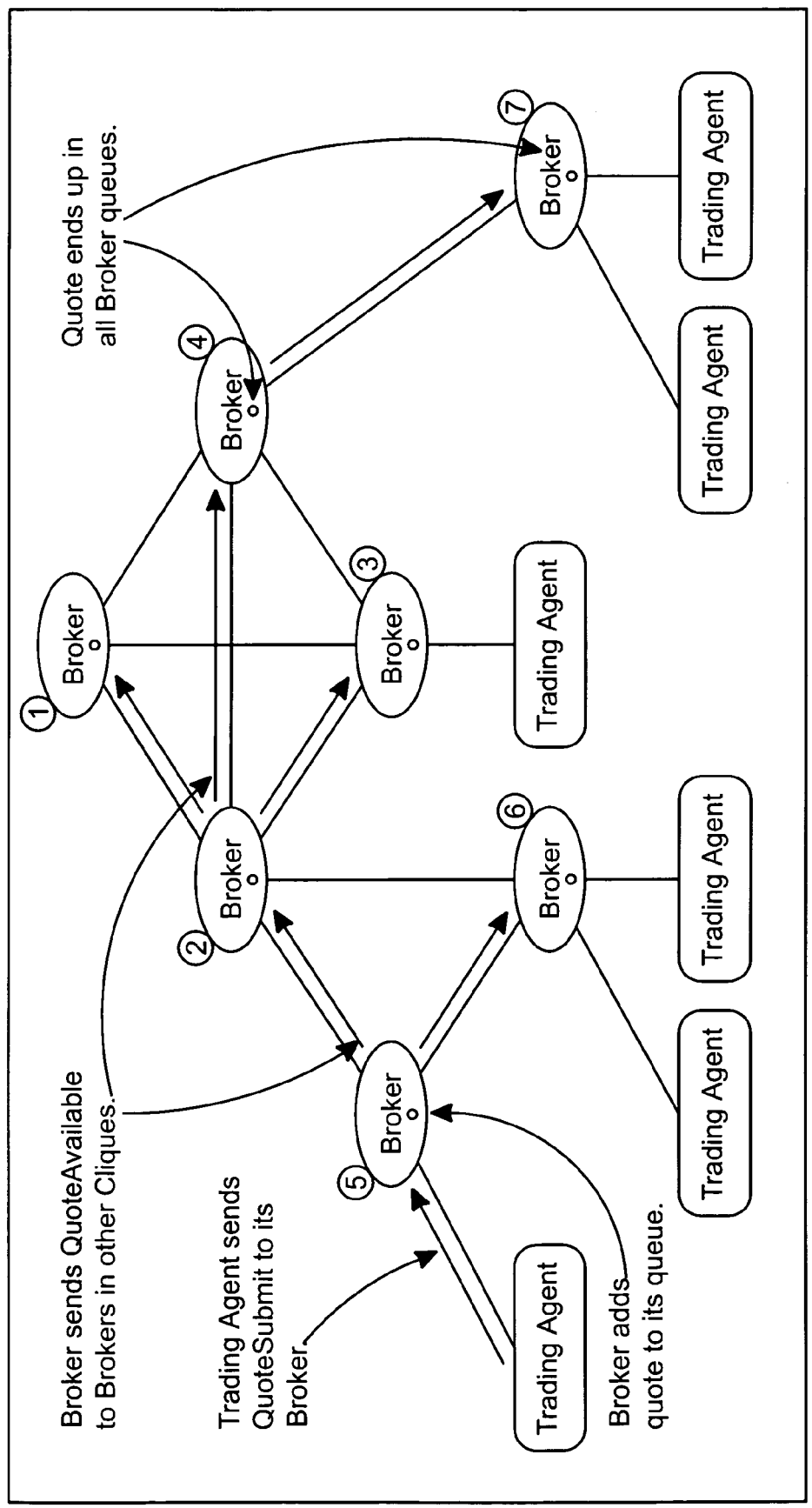
FIG. 2 shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has "invisible" and "fill or kill" properties ("invisible"). Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes. In a system such as foreign exchange there will, effectively, be two books, one showing orders to buy and the other showing orders to sell.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker 11 node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbours except those in the same clique as the broker who sent the message. Therefore, Broker node 2 sends it to 1, 3 and 4. Broker node 4 then sends it co Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
    1. The Broker node originating information will send it to all of its neighbour Broker nodes.

2. A Broker node receiving the information will send it to all of its neighbours Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so the above rules apply.

Figure 3:
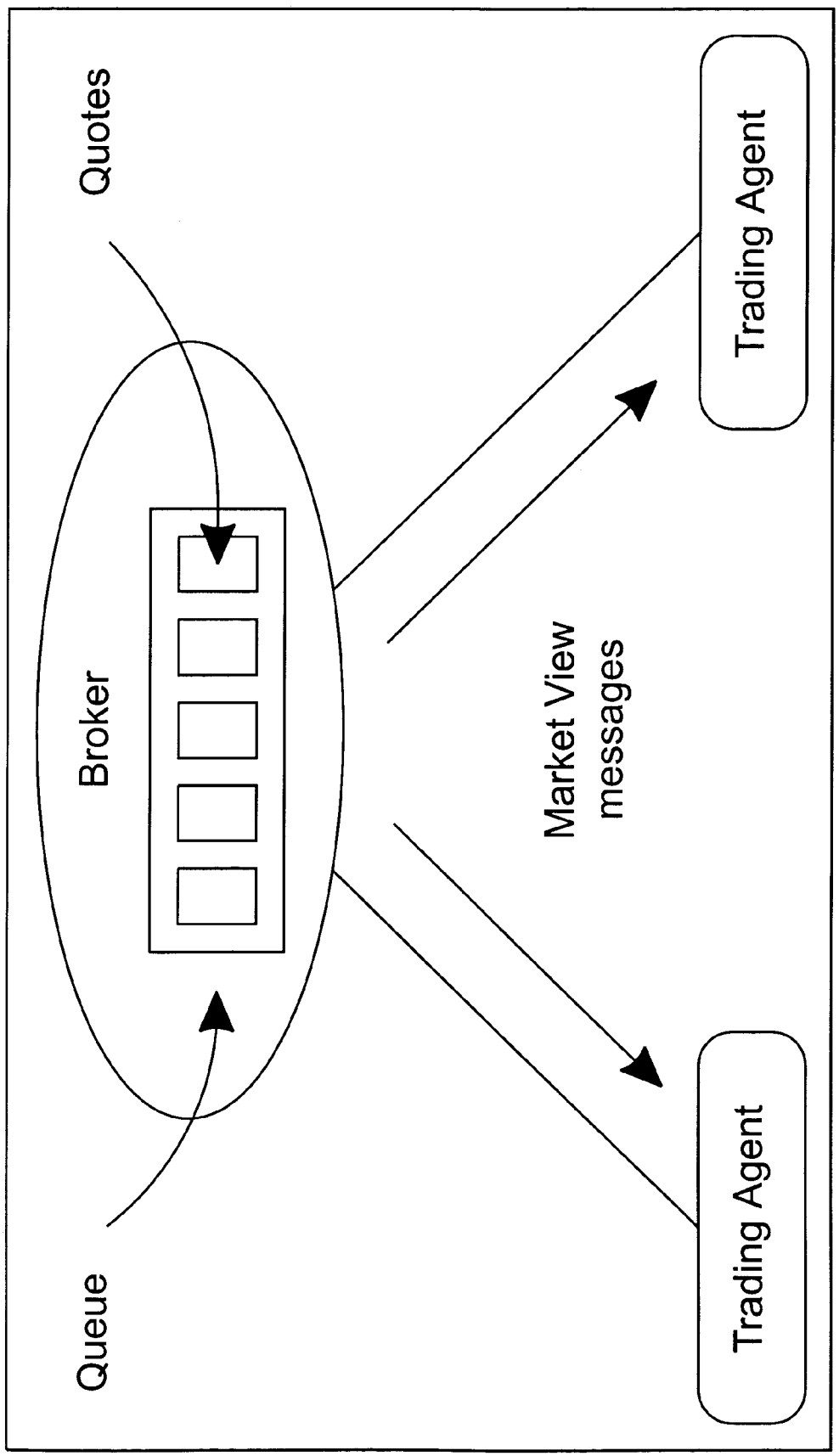
FIG. 3 depicts the production of a market view to traders.
Figure 4:
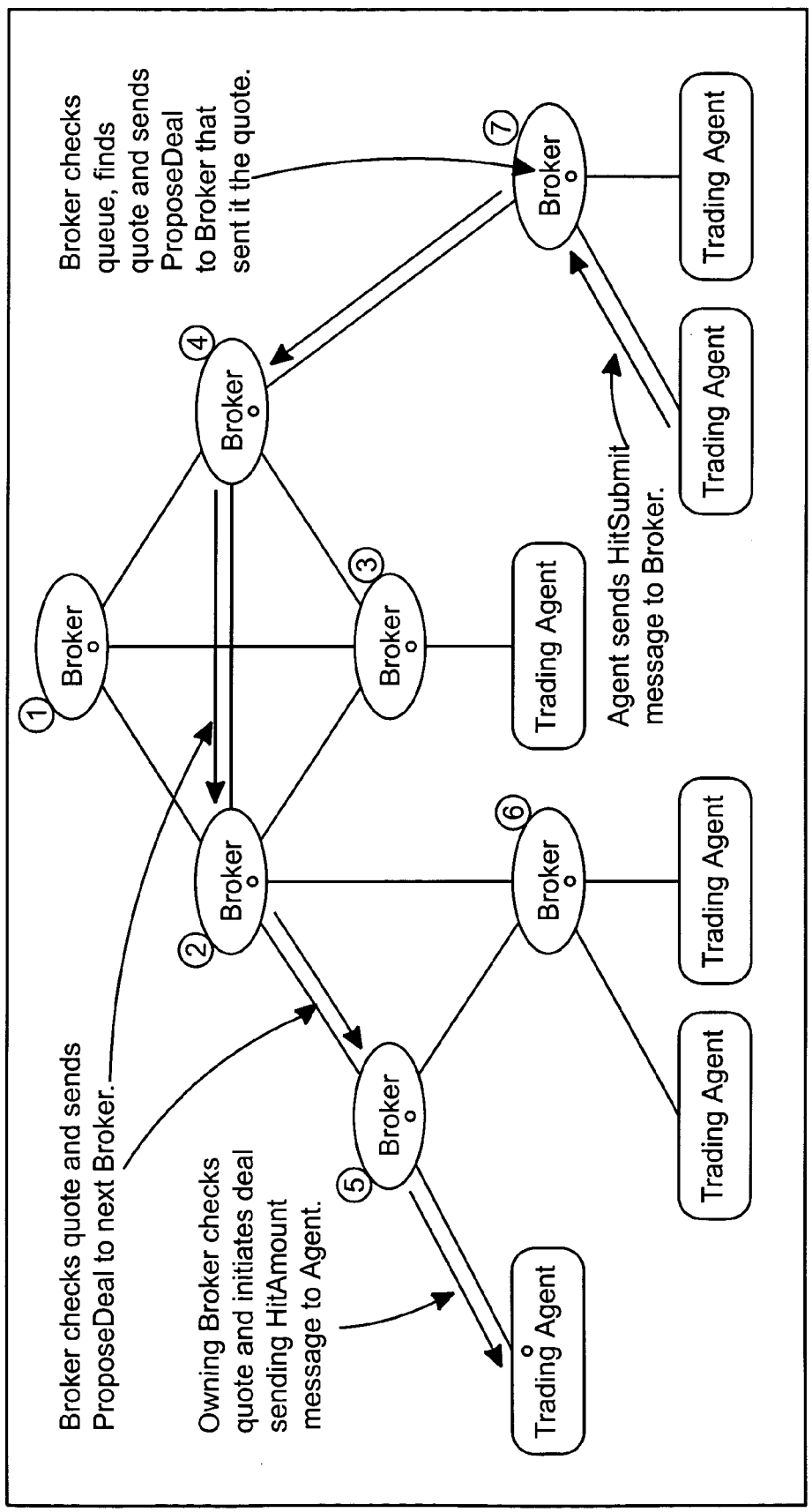
FIG. 4 shows the flow of messages when a trader submits a buy or sell order.

Price distribution is the process of providing market information to the traders at the trader terminals. This information is created by the Broker nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message. It follows, therefore, that each of the brokers holds information about the credit relationships between all parties and counterparties.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, the hit comes from a trader connected to a trading agent connected to broker 7. Broker 7 will send the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:

1. A Broker node originating a message about a specific piece of information will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 4 and 2.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
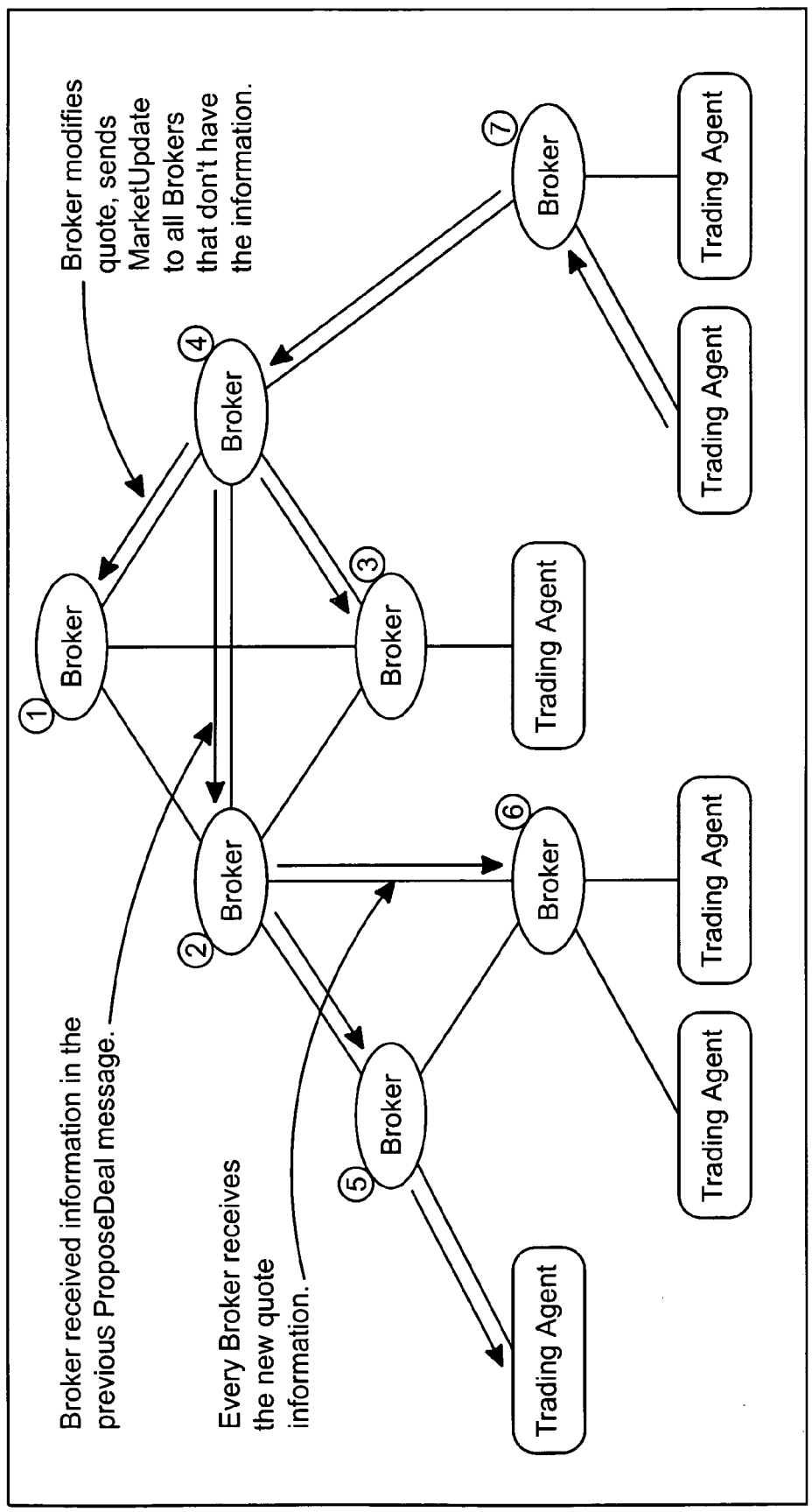
FIG. 5 shows the flow of messages to update broker nodes following a buy or sell order.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbour Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbours not in the clique from which it is received. Note that a Broker node sending a ProposeDeal message should not also send a MarketUpdate message to the same Broker node. This would result in duplicate information being received and the deal amount being reserved twice.

Figure 6:
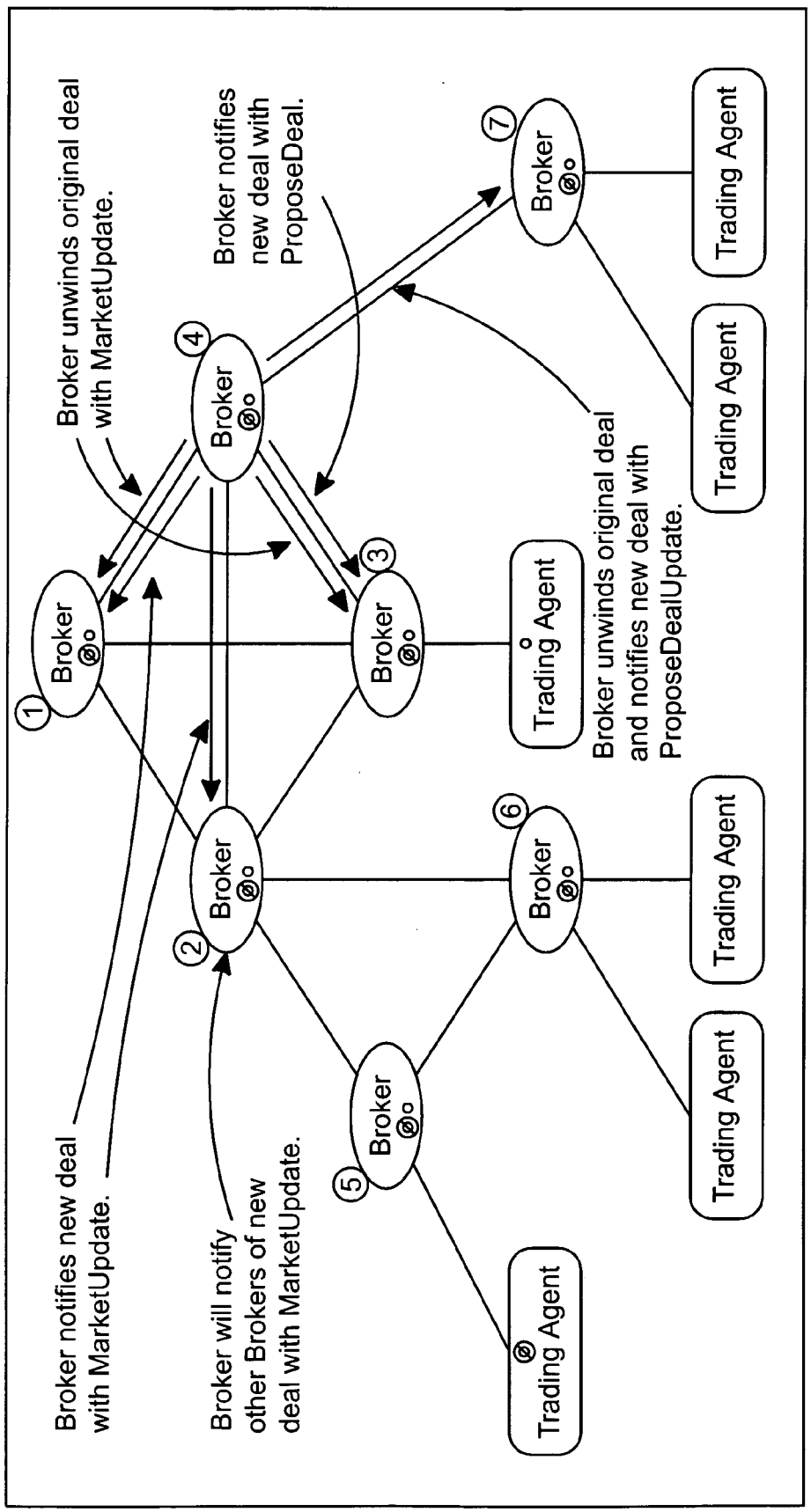
FIG. 6 shows the flow of messages when a broker updates a quote.

When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the deal confirmation continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. It should be remembered that deals are unlikely to be rejected at this stage as prices shown to traders are pre-screened for credit. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't yet know. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The DealInformation message is sent to the Broker node. The network Broker nodes will then route the message to the other Agent where the information is processed as required by the instrument. A deal is thus completed.

Once the deal is complete, the two parties will know the identity of their respective counterparty for the first time. The identity will be displayed on their terminal screen and shown, for example, in a listing of deals performed in that trading session as well as printed on the deal ticket and logged to disk. Each of these comprises a means for identifying to each of the parties to an executed deal the counterparty to the deal.

The manner in which credit is handled in the system described will now be considered in more detail.

As mentioned previously, the system screens prices and deals matching using credit, as a result of which all prices shown to a deal should be available for trading. It will be understood from the foregoing description that this requires each broker to have sufficient credit information to be able to make credit decisions. This is because the brokers are responsible for forming the market view which is distributed to communicating trading agents. The actual credit data is very complex and can vary by product and institution. For example, the concept of credit in an FIX trading system is straightforward as it is a spot market. However, for a product such as FRA's it is more complex as deals are done over a variety of time periods. Some banks may prefer to assign credit to a counterparty over the whole of the range of their trading activities whereas some banks will prefer to assign credit to counterparties for a given financial instrument.

The system uses a single numeric value for each combination of trading floor, counterparty trading floor and tradable element. The purpose of the numerical value is to determine whether the two floors have credit to deal in a particular element. The meaning of the numerical value is specific to the instrument being traded. For example, spot FIX uses the value as a yes/no flag (1 or 0) whereas in Forward Rate Agreements (FRA) the value is used as a bit mask for FRABBDA/ISDA decisions. Other instruments will have other meanings. The credit is bi-lateral. Credit must exist between two floors for any dealing activity to take place. The credit check is made for a given trading element or pattern of trading elements as determined by the instrument. As the system is bilateral the broker will compare two credit values; that given by the first floor to the second and that given by the second floor to the first. If the values are compatible, the dealing operation is allowed. The meaning of compatible will be determined by the instrument. In terms of spot F/X if the amount proposed for the trade is lower or equal to the lowest of the two no credit values the deal can proceed. Even if the deal is greater than the lowest credit value it may still proceed but only for a part of the proposed deal amount equal to the lowest credit value.

The full credit information for a credit floor is originated for a trading agent that has credit authority for a trading floor. This agent only has part of the total information; that relating to its own trading floor although it is possible that more that one trading floor is connected to a Trading Agent. When the credit information changes, the Trading Agent will sent a CreditUpdate message to its broker. The broker will combine the information from the Agent into its total credit matrix and pass the message to neighbour brokers as a broadcast message following the rules set out earlier. Each broker will also store a record of from where the credit information for a given floor came from.

In the prior art system described in WO93/15467 the bank node holds the credit authority for a floor and is also responsible for dealing activity for the floor. The deal execution process described earlier is based on this credit model which is known as local credit.

During the deal execution the Trading Agent is presented with a potential deal. The Agent will examine the details of the deal and determine how much credit is required to complete the deal. It will check the available credit and, if it is insufficient the Agent may reduce the amount of the deal or disallow the deal. The amount of credit actually needed (the whole or reduced amount) is reserved from the pool of available credit. This credit is not available for other deals. If this reduces the available credit for other deals below the dealing threshold the Agent will send a CreditUpdate message to notify the broker that credit is no longer available.

When the deal is completed, the maker's Agent will be notified with a DealStatusTaker message. The Taker's Agent will then be aware of the completed deal. The Agent will then determine the credit that was actually used by the deal. This credit will be removed from the credit pool as consumed credit. Any remaining amount from the original reservation will be returned to the original pool.

As an alternative to local credit, a bank may adopt a Global Credit Model in which the Trading Agent that holds the credit authority for a floor is not the same Agent that performs the dealing activity for that floor. The Agent with credit authority may, but does not have to, perform dealing activity for a floor. This arrangement allows all the floors of an institution to share a common pool of credit and the creation of separated credit nodes within the network for some floors. The deal execution process for this type of credit arrangement is more complicated than for the local credit example described earlier.

Figure 8:
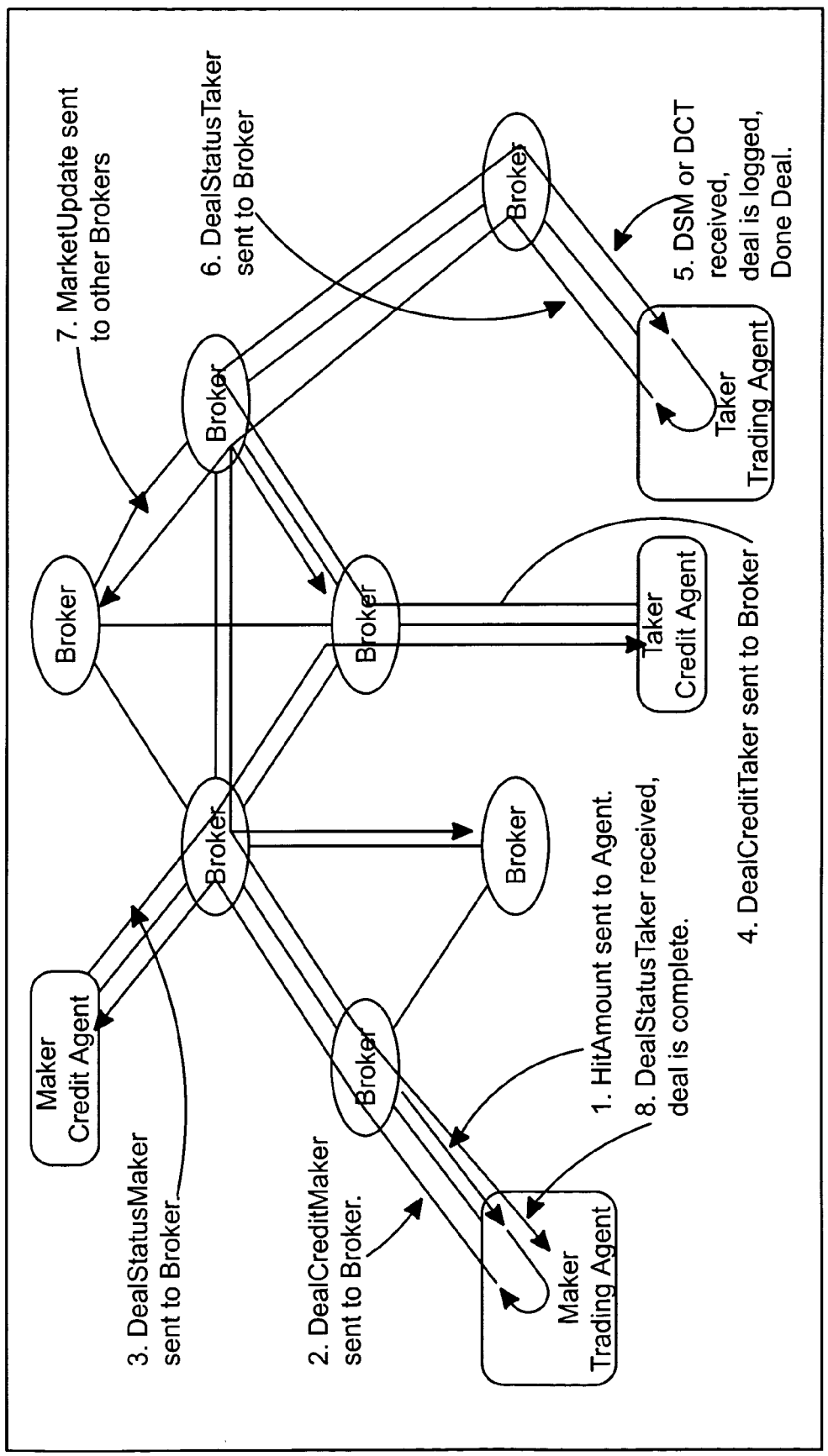
FIG. 8 shows the message flow in a global credit environment.

FIG. 8 shows the credit message flow during deal execution with global credit.

The credit distribution process is the same as in the local credit example in that credit information is still distributed to all brokers. Each broker knows where the information came from and can route a message back to the Trading Agent with credit authority.

Figure 7:
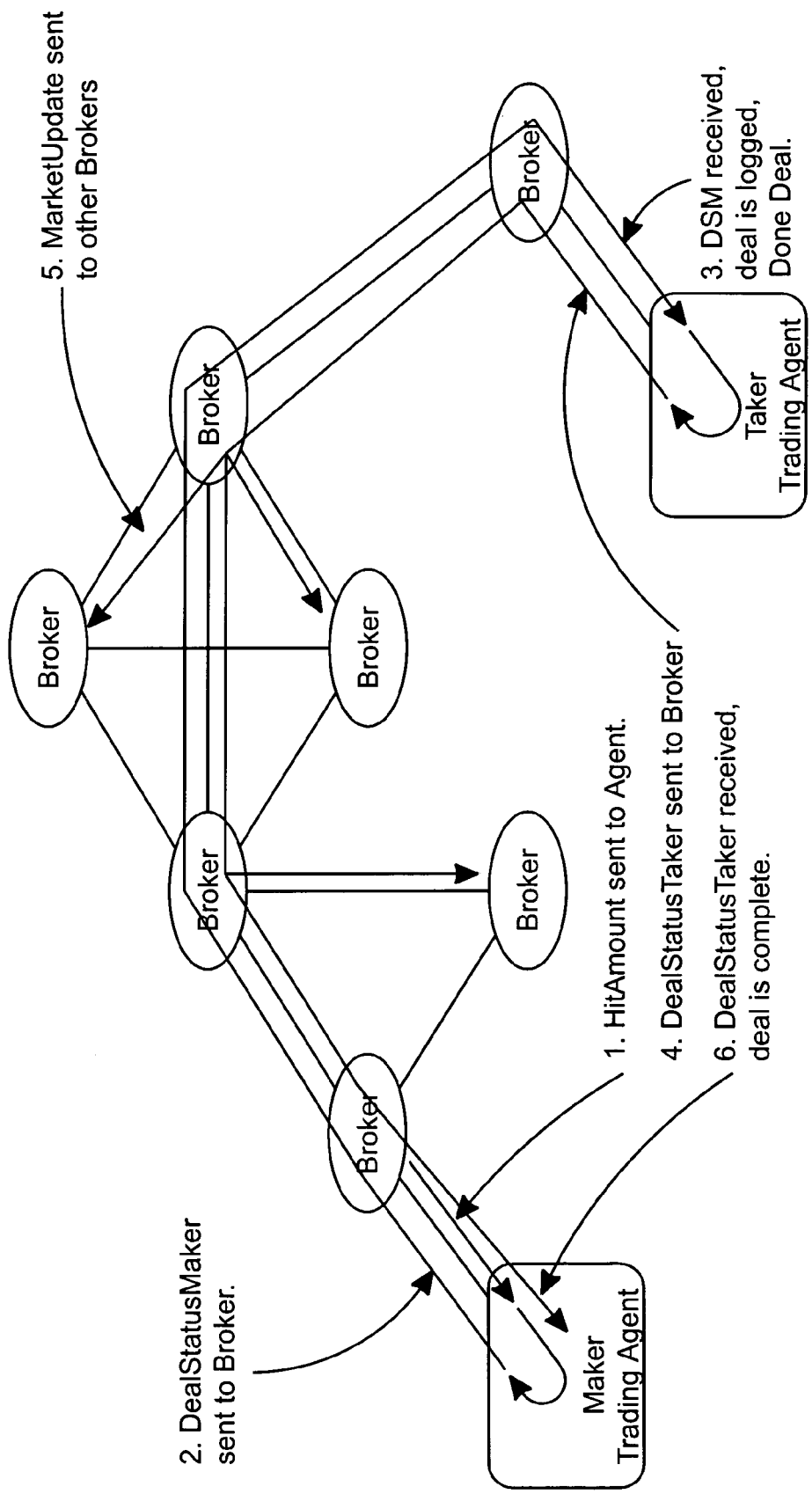
FIG. 7 shows the deal execution process.

In the example of FIG. 7, the Maker and Taker Trading Agents 100, 110 do not have credit authority for their floors. Credit must therefore be confirmed by the two Trading Agents 120, 130 which do have that authority and which may be referred to as Maker and Taker Credit Agents.

When the Maker Trading Agent 100 processes a deal it will first check that the quote is still available in the manner described previously and it notifies the dealer of the pending deal. However, it cannot check the credit position itself and so does not send the DealStatusMaker message itself. Instead, a DealCreditMaker message 140 is sent to the broker 150 to which the Trading Agent is attached. The broker 150 routes the DealCreditMaker message 140 to the Maker Credit Agent 120, which is the source of credit information for the trading floor to which the Trading Agent 100 is performing the dealing activity. Once the Maker Credit Agent 120 has performed the credit check as described previously, it sends the DealStatusMaker message 160 to broker 170.

The DealStatusMaker message 160 is routed by the broker 170 not to the Taker Trading Agent but to the source of credit for the taker, in this case the two are not the same and the DealStatusMaker message is routed to the Taker Credit Agent 130. The Taker Credit Agent 130 then performs credit checking as described previously and sends a DealCreditTaker message 180 to the broker 190 to which the Taker Credit Agent is connected. Of course, if the Taker Trading Agent has credit information for the trading floor the DealCreditTaker message 180 is not necessary.

The DealCreditTaker message 180 is routed by the broker network to the source of the original hit using the targeted routing rules described previously.

When the Trading Agent 110 that originally proposed the deal received the DealCreditTaker message 180 the deal is done and logged at the Taker Trading Agent and the deal execution process carries on as described earlier with respect to FIG. 6.

The Maker and Taker Credit Agents 120, 130 perform credit reservation in the same manner as described in the local credit example. The Maker Credit Agent reserves credit when it receives the DealCreditMaker message and the Taker Credit Agent reserves the credit when it receives the DealStatusMaker message 160. Credit consumption is then performed when the Maker and Taker Credit Agents 120, 130 receive the DealStatusTaker message 200 from the Taker Trading Agent 110.

It may be desired for more that one Trading Agent to hold the credit authority for a floor to increase reliability and performance. In such a case, any one such Credit Agent may confirm a deal. It is the responsibility of those Agents to communicate and keep the credit pool correct between themselves. This process is specific to an instrument or institution. Each broker will receive multiple CreditUpdate messages for the same floor. The brokers must decide which message to accept. The broker will examine a "hop count" in the message to determine which message came from the closest source. The message with the higher hop count is not processed and is not routed.

The Credit Agent for a floor or institution has to maintain the pool of available credit and adjust the credit information as credit is used and restored. The manner in which this is done is specific both to the institution and the instrument being traded.

One reason for a bank adopting a global approach to credit is to increase the flexibility available in trading. If a bank comprises several floors each of which have a preassigned amount of credit with various counterparties, a situation can arise in which some of the floors trade up to their credit limits but others do not. Those floors which went up to their limits would have liked access to the unused credit on the other floors to maximise trading within the banks overall trading limit with a given party. That overall trading limit may not be confined to a single trading instrument but cover the range of the bank's activities, some of which may be traded on anonymous electronic systems and others of which may not.

Whichever of the global or local credit models is used it is undesirable and inflexible to tie up more credit in the electronic broking system than is absolutely necessary. The credit adjustment made in prior art systems on completion of a trade is completely independent of any other trading activities that has taken place. Thus, if bank A sells $10M to bank B and then buys $9M from bank B, both parties' credit will be drawn down by $19M, the combined value of the two transaction. However, this is not a fair representation of the risk undertaken by either party as the net exposure is $1M. This is undesirable as the main purpose of credit limits is to limit the exposure of a bank. However, in this example the exposure is far within the exposure the bank considers acceptable and the effect is to prevent the bank from trading up to a level of risk it considers appropriate.

In an embodiment of the invention this problem is overcome by netting when adjusting utilised credit after deal execution. Under this arrangement the sense of the deal with a couterparty, that is whether it is a buy or a sell is taken into account when adjusting utilised credit. This has the advantage of better reflecting the true level of risk to which the bank is exposed and allows more trading to be undertaken within the confines of the set credit limits.

Within the trading system described, institutions may decide whether or not to net with other institutions. Thus, a given institution may define netting credit groups. The trading system described may trade a number of different instruments, such as spot FX, FRA's etc. Netting may be on a per instrument basis or on a cross instrument basis. Where an institution defines netting as being on a cross instrument basis it may designate which instruments are to be included for netting calculation purposes.

In considering which trades may be netted, the settlement date of the trade is also an issue. An institution may net by settlement date, by time bucket or by total credit exposure. Each of these may be on a per instrument or cross instrument basis and each will now be briefly considered.

FIG. 9 illustrates a simple example of netting by settlement date on a per instrument basis. Whenever an instrument is traded such that there is a delivery of currency or value on a specific date, the settlement date, it is possible for that delivery of currency to be netting against a receipt of that same currency for value on the same specific date with the same counterparty.

In the FIG. 9 example, Bank A buys EUR 10 million v USD of a rate of 1.07 (selling USD 10,700,000) for value Aug. 3, 2000 from Bank B. Later on, Bank A sells EUR 10, million v USD at a rate of 1.08 (buying USD 10,800,000) for value Aug. 3, 2000, from Bank B.

If the two parties have a netting agreement, there will be no EUR payment as the net result of the two EUR transactions is +10M−10M=0. The net result of the two USD transactions is a payment from Bank B to Bank A of USD 100,000 representing the difference between the USD sale and purchase. Thus, the amount of credit utilised or the total exposure to Bank A is USD 100,000. This assumes that USD are the credit limit currency. If not, the exposure amount is converted into the credit limit currency at a credit limit currency conversion rate which is stored within the trading system.

FIG. 10 shows a more complex example. In this example, Bank A buys the same EUR 10M v USD as in the FIG. 9 example. However, instead of selling the EUR 10M v USD, the sale is v JPY (Japanese Yen) at a rate of 125, buying JPY 1,250M again for value 3 Aug. 2000 from Bank B. The net result of the two transactions if the banks have a netting agreement, from Bank A's perspective is as follows:

USD exposure=0

Bank A has only sold US dollars and therefore has no USD credit exposure.

EUR exposure=0

Bank A has bought and sold EUR 10M and the total exposure is therefore zero.

JPY exposure=JPY1,250M

This is the amount owed to Bank A by Bank B and so the amount of credit exposure.

Thus, the amount of credit used by bank A is the JPY exposure amount converted into USD, assuming that USD is the credit limit currency. If one were to assume a rate of JPY/USD=118 then the exposure is USD 10,593,220. Thus, each netted currency exposure is calculated for each value date and then converted into the credit limit currency equivalent. If the exposure is negative, in which case Bank A owes the currency, then this is considered to be zero. This is the case if there is no cross instrument netting. The positive credit limit currency equivalent amounts are added together and this is the total credit utilisation for that value date for that instrument.

In the trading system described, prices shown to traders are pre-screened for credit. Thus, if an order has been put into the system and there is insufficient credit with the owner of that order, the quote is not displayed to the trader. Netting affects the pre-screening for credit. Considering a single sided example for simplicity, if Institution A has a limit for trades with Institution B of USD 10M and buys USD 10M, there is no credit left with that Institution and offers from that counterparty must be screened out and not shown to Bank A's traders. However, as Banks A and B have a netting agreement, bids from Bank B must be shown. If Bank B were now to bid USD 10M, offering to buy 10M from Bank A, conclusion of the transaction would reduce Bank A's exposure to Bank B to zero.

FIG. 11 shows how this works for the two currency pair of example of FIG. 10. Assume first, that the Institution gave a credit limit of USD 11M to the credit group. The first trade, of USD 10.7M has used all but USD 300,000 of this credit which is below the permitted minimum deal size. The system must only show bids of JPY v any other currency. Any selling of JPY up to JPY 1,250M v any currency other that USD would result in, at worse, the same net exposure. The selling of JPY 2,500M v USD would result in a reduction in exposure.

The examples given above have used spot FX as the instrument. The system will work with any single instrument.

The examples given above related only to netting by settlement date on a per instrument basis, explicitly addressing spot FX. Netting can be done cross instrument provided that the settlement date of the delivery of the currency is the same. The general rule of cross instrument netting by settlement date is the same as that for the per instrument example. Each netted currency exposure is calculated for each value date and is then converted into the credit limit currency equivalent. The difference is that in addition to spot FX, other designated instruments are included in this calculation. If the exposure is negative, so that Bank A owes the currency, then the amount is considered to be zero. The positive credit limit currency equivalent amounts are added together and this is the total credit utilisation for that value date.

Instead of netting by settlement date, instruments may be traded such that there is a delivery of currency for a value on a date within a specific floor-timed window, often referred to as a time bucket. Delivery of currency may be netted against a receipt of that same currency for value on another, or the same, date within that same specific floor-defined time bucket with the same counterparty.

By way of example, Bank A may establish a series of three-month time buckets. Assuming that the date is 26 Apr. 2000 and the spot date is 28 Apr. 2000. The three month time buckets will end on 28 Jul. 2000, 28 Oct. 2000, 28 Jan. 2001 etc. Going back to the example of FIG. 9, Bank A buys EUR 10M v USD at a rate of 10.07 (selling USD 10.7M) for value Aug. 3, 2000 from Bank B. Later Bank A sells EUR 10M v USD at a rate of 1.08 (buying USD 10.8M) for value Aug. 10, 2000 from Bank B. In the netting settlement date example, there would be no netting possible. However, as both value dates are within the 28 July–28 October time bucket netting is possible. The net result of the transaction is, as in the FIG. 9 example, no EUR expose using USD 100,000 of credit within that time bucket.

As with the settlement date example, netting by time bucket may be on a cross instrument basis. Thus, whenever instruments are traded as such that there is a delivery of currency for value on a date within a specific floor-defined time bucket, it is possible for that delivery of currency to be netted against the receipt of the same currency for value on another (or the same) date within that same specific floor-defined time bucket with the same counterparty. Again, the general rule is the same as in the settlement date cross instrument example except that trades falling within the same time bucket are eligible for netting.

In all the examples given above, netting has been determined by the value date of the trade. In another alternative, netting may be on the basis of total credit exposure. Thus, whenever an instrument is traded, regardless of the value date, the delivery of currency associated with that instrument may be netted against the receipt of that same currency with the same counterparty. As in previous examples, each currency exposure is calculated and then converted into the credit limit currency equivalent. If that total exposure is negative, the exposure is considered to be zero. If it is positive, then this is the total credit utilisation.

The total credit exposure example may be extended on a cross instrument basis such that whenever multiple instruments are traded, regardless of value date, the delivery of currency associated with those instruments is netted against receipts of that same currency with the same counterparty. Each currency exposure, per instrument, is calculated and totalled. This total is then converted into the credit limit currency equivalent. If that total exposure is negative it is considered to be zero. If it is positive, then this is the total credit utilisation.

Thus, it can be seen that by netting trades between banks the credit available can effectively be increased greatly under some circumstances, correctly reflecting the actual exposure entered into by the bank and enabling more trading in a given trading day than was previously allowable.

FIG. 12 shows how the credit limits would have been adjusted if the trades of FIG. 9 had been applied without netting was performed by prior art systems. Here, each of the two trades would result in the credit limits being decreased by the USD value of the trade such that the total reduction in credit for the two trades would be USD21.5M. Thus, the arrangement of the present invention frees up over USD21M of credit available for further trades compared to the prior art. In turn, institutions need not assign so much credit to the anonymous trading system freeing up further credit for use in other trading activities.

Thus, it can be seen that by netting trades between the credit available can effectively be increased greatly under some circumstances, correctly reflecting the actual exposure entered into by the bank and enabling more trading in a given trading day than was previously allowable.

In the context of the system described, netting will be performed by the Maker and Taker Trading Agents whether local credit is employed and by the Maker and Taker Credit Agents where global credit is employed or a combination of these two models may be in use.

What is claimed is:

1. An anonymous trading system for trading instruments between trading parties; comprising:
   a communications network for transmitting electronic messages;
   a plurality of order input devices connected to the communications network each for generating electronic orders including bid and/or offer orders and for communicating to a trader order information received from others of said plurality of order input devices over the network;
   at least one matching engine connected to the network for matching bid and offer orders input into the system from the order input devices and for executing deals where prices are matched;
   a market distributor connected to the network for distributing order price messages to the trader terminals, the market distributor being responsive to the order messages and the matching engine;
   a credit limit store for storing credit available for trades between each trader or group of traders and possible counterparty traders or groups of traders; and
   a credit adjuster for adjusting the credit available for future trades between a given party and a counterparty following a trade with that counterparty, the credit adjustment means calculating the change in exposure to the party resulting from the trade and adjusting the credit available in accordance with the change in exposure that results from a netting of trades between a given party and each counterparty.

2. An anonymous trading system according to claim 1, wherein the order input devices for a given trading floor are connected to a trading agent node connected to the communications network, wherein the credit limit store and the credit adjuster for a given trading floor are resident at the trading agent node to which the trading floor is attached.

3. An anonymous trading system according to claim 1, wherein the order input devices for a given trading floor are connected to a trading agent node connected to the communications network, and the credit limit store and the credit adjuster for a given trading floor are resident at a further trading agent node.

4. An anonymous trading system according to claim 3, wherein the trading agent node for a given trading floor comprises a messenger for sending to the separate trading node on which the credit limit store and credit adjuster for that trading floor resides, a credit enquiry message when a deal with a given counterparty is proposed.

5. An anonymous trading system according to claim 1, wherein the credit limit store is at least partially resident at the matching engine.

6. An anonymous trading system according to claim 5, wherein the matching engine includes a subset of the credit limits available.

7. An anonymous trading system according to claim 1, wherein the credit adjuster and the credit limit store together store the credit limit between the trading floor and each possible counterparty, and, for each counterparty, the amount of credit utilised, the amount of each deal, whether each deal is a buy or sell and the amount of credit available for further trades.

8. An anonymous trading system according to claim 1, wherein the matching engine and the market distributor together form a single broking node of the communications network, the network comprising a plurality of broking nodes.

9. An anonymous trading system according to claim 8, wherein each broking node stores a subset of the credit limit information for each trading floor connected to the system.

10. An anonymous trading system according to claim 9, wherein the system trades foreign exchange spot and the subset of credit limit information stored by each broking node comprises an identification of whether or not credit exists between each party and each possible counterparty.

11. An anonymous trading system according to claim 10, wherein the subset of credit information is a yes/no matrix.

12. An anonymous trading system according to claim 1, wherein the instrument traded includes two or more currency values and the credit adjuster includes a calculator for calculating the currency exposure in each currency.

13. An anonymous trading system according to claim 12, wherein the credit adjuster includes a converter for converting the calculated currency exposures into a credit limit base currency equivalent.

14. An anonymous trading system according to claim 13, wherein the credit adjuster calculates the currency exposure in each currency for a plurality of financial instruments.

15. An anonymous trading system according to claim 14, wherein the credit adjuster includes a calculator for calculating exposure at a settlement date.

16. An anonymous trading system according to claim 14, wherein the credit adjuster includes a calculator for calculating exposure within a time bucket.

17. An anonymous trading system according to claim 12, wherein the credit adjuster includes a calculator for calculating exposure at a settlement date.

18. An anonymous trading system according to claim 12, wherein the credit adjuster includes a calculator for calculating exposure within a time bucket.

19. An anonymous trading system according to claim 12, wherein the credit adjuster calculates the currency exposure in each currency for a plurality of financial instruments.

20. An anonymous trading system according to claim 19, wherein the credit adjuster includes a calculator for calculating exposure at a settlement date.

21. An anonymous trading system according to claim 19, wherein the credit adjuster includes a calculator for calculating exposure within a time bucket.

22. An electronic broking system for trading financial instruments between trading parties; comprising
 a communications network for transmitting electronic messages and including a plurality of broking nodes and a plurality of trading agent nodes, each trading agent being connected to a broking node;
 a plurality of order input devices, the trading terminals of a trading floor being connected to a trading agent node; each order input device generating electronic order messages including bid and/or offer orders and for communicating order price information received from others of said plurality of order input devices from the trading agent node;
 wherein each broking node comprises a matching engine for matching bid and offer orders input into the system from the order input devices, for executing deals where prices are matched and for distributing to the order input devices order price messages in response to the order price messages and the matching engine;
 the system further comprising a credit limit store for storing credit limits available for trades between each trader or group of traders and possible counterparty traders or groups of traders; and
 a credit adjuster for adjusting the credit available between a given party and a counterparty following a trade with that counterparty, the credit adjuster determining the change in exposure to the party resulting from the trade and adjusting the credit available in accordance with the change in exposure that results from a netting of trades between a given trader and each counterparty.

23. An anonymous trading system according to claim 22, wherein the instrument traded includes two or more currency values, and the credit adjuster includes a calculator for calculating the currency exposure in each currency.

24. An anonymous trading system according to claim 23, wherein the credit adjuster includes a converter for converting the calculated currency exposures into a credit limit base currency equivalent.

25. An anonymous trading system according to claim 23, wherein the credit adjuster includes a calculator for calculating exposure at a settlement date.

26. An anonymous trading system according to claim 23, wherein the credit adjuster includes a calculator for calculating exposure within a time bucket.

27. An anonymous trading system according to claim 23, wherein the credit adjuster calculates the currency exposure in each currency for a plurality of financial instruments.

28. An anonymous trading system according to claim 27, wherein the credit adjuster includes a calculator for calculating exposure at a settlement date.

29. An anonymous trading system according to claim 27, wherein the credit adjuster includes a calculator for calculating exposure within a time bucket.

30. An electronic broking system for trading financial instruments between trading parties; comprising
 a communications network for transmitting electronic messages and including a plurality of broking nodes and a plurality of trading agent nodes, each trading agent being connected to a broking node;
 a plurality of order input devices, the order input devices of a trading floor being connected to a trading agent node; each order input device generating electronic order quotation messages including bid and/or offer orders and communicating order price information received from others of said plurality of order input devices from the trading agent node;
 wherein each broking node comprises a matching engine for matching bid and offer orders input into the system from the order input devices, for executing deals where orders are matched and for distributing to the trader terminals order price messages, the distribution being responsive to the order price messages and the matching engines;
 and wherein at least some of the trading agent nodes comprise a credit limit store for storing credit limits available for trades between each trader or group of traders and possible counterparty traders or groups of traders; and further comprise
 a credit adjuster for adjusting the credit available between a given party and a counterparty following a trade with that counterparty, the credit adjuster adjusting the credit available by determining the change in exposure to the party resulting from the trade and adjusting the available credit in accordance with the change in exposure that results from a netting of trades between a given party and each counterparty.

31. An electronic broking system according to claim 30, wherein the credit limit store and credit limit adjuster for a given trading floor are located at the trading agent node to which the order input devices of said trading floor are connected.

32. An electronic broking system according to claim 30, wherein the credit limit store and credit limit adjuster for a given trading floor are located at a trading agent node to which the order input devices of the trading floor are not directly connected.

33. An anonymous trading system according to claim 32, wherein the instrument traded includes two or more currency values, and the credit adjuster includes a calculator for calculating the currency exposure in each currency.

34. An anonymous trading system according to claim 33, wherein the credit adjuster includes a converter for converting the calculated currency exposures into a credit limit base currency equivalent.

35. An anonymous trading system according to claim 33, wherein the credit adjuster includes a calculator for calculating exposure at a settlement date.

36. An anonymous trading system according to claim 33, wherein the credit adjuster includes a calculator for calculating exposure within a time bucket.

37. A method for trading, on a computer-implemented anonymous trading system, at least one tradable item between a first and a second trader, the first trader defining a credit limit for trades with the second trader, the method comprising, on one or more computers, performing the steps of:
performing a first trade between the first and second trader;
adjusting the credit limit based on the first trade;
performing a second trade between the first and second trader; and
adjusting the credit limit based on the total exposure of the first trader from the second trader in light of both the first and the second trade, the total exposure being based on a netting of trades between the first and second trader.

38. The method as recited in claim 37, wherein the total exposure is for a defined time period.

39. The method as recited in claim 38, wherein the time period is one day.

40. The method as recited in claim 38, wherein the time period is a time bucket.

41. The method as recited in claim 37, wherein the adjusting includes converting any currency in the first and second trade into a credit limit currency.

42. The method as recited in claim 37, further comprising the steps of: producing a market view for the traders; and when the credit limit is below a threshold so that offers from the second trader will not be hit by the first trader, showing bids of the second trader in the market view for the first trader.

43. The method as recited in claim 37, wherein:
the second trader is comprised of a group of trading entities; and
the adjusting adjust the credit limit for the group.

44. The method as recited in claim 37, wherein the adjusting is based on trades for a single type of tradable item.

45. The method system as recited in claim 37, wherein the adjusting is based on a settlement date of trades between the traders.

46. The method as recited in claim 37, wherein the adjusting is based on trades which will be settled within the same time bucket.

47. The method as recited in claim 37, wherein the total exposure is based on trades including at least two distinct currency pairs.

48. An anonymous trading system for trading instruments between a first and second trader, the first trader defining a credit limit for trades with the second trader, the system comprising:
a communications network; and
at least one broker terminal coupled to the communications network, the broker terminal effective to match orders between traders and for communicating with at least one of the first and second trader;
wherein the broker terminal is effective to adjust the credit limit based on the total exposure of the first trader from the second trader, the total exposure being based on a netting of trades between the first and second trader.

49. The trading system as recited in claim 48, wherein the broker terminal is further effective to receive and convey orders from traders coupled thereto.

50. The trading system as recited in claim 48, wherein:
the broker terminal is effective to produce a market view for the traders; and
when the credit limit is below a threshold so that offers from the second trader will not be hit by the first trader, the broker terminal shows bids of the second trader in the market view for the first trader.

51. The trading system as recited in claim 48, wherein:
the second trader is comprised of a group of trading entities; and
the broker terminal is effective to adjust the credit limit for the group.

52. The trading system as recited in claim 48, wherein the broker terminal is effective to adjust the credit limit based on trades for a single type of tradable item.

53. The trading system as recited in claim 48, wherein the broker terminal is effective to adjust the credit limit based on a settlement date of trades between the traders.

54. The trading system as recited in claim 48, wherein the broker terminal is effective to adjust the credit limit based on trades which will be settled within the same time bucket.

55. The trading system as recited in claim 48, wherein the total exposure is based on trades including at least two distinct currency pairs.

56. The trading system as recited in claim 48, wherein the total exposure is for a defined time period.

57. The trading system as recited in claim 56, wherein the time period is one day.

58. The trading system as recited in claim 56, wherein the time period is a time bucket.

59. A trading system for trading at least one tradable item between a first trader and a second trader, the first trader defining a credit limit for trades with the second trader, the system comprising:
a communications network; and
at least one broker terminal coupled to the communications network, the broker terminal effective to match orders between traders and for communicating with at least one of the first and second trader;
wherein the system is effective to adjust the credit limit based on the total exposure of the first trader from the second trader, the total exposure being based on a netting of trades between the first and second trader.

60. The trading system as recited in claim 59, wherein:
the second trader defines another credit limit for trades with the first trader; and
the system is effective to adjust the another credit limit based on the total exposure of the second trader from the first trader.

61. A system of trading at least one tradable item between a first trader and a second trader, the system comprising:
the first trader; and
the second trader,
the first trader defining a credit limit for trades with the second trader, wherein the credit limit is adjusted based on the total exposure of the first trader from the second trader, the total exposure being based on a netting of trades between the first and second trader.

62. A broker terminal in a trading system, the trading system including a communications network, the broker terminal coupled to the network and effective to match orders between traders, the trading system further including a first trader and a second trader, the first trader defining a credit limit for trades with the second trader, wherein the broker terminal includes executable software for performing the acts of:

- receiving notification that a first trade has been executed between the first and second traders;
- adjusting the credit limit based on the first trade;
- receiving notification that a second trade has been executed between the first and second traders; and
- adjusting the credit limit based on a total exposure of the first trader from the second trader, the total exposure being based on a netting of trades between the first and second trader.

63. A trading system for trading fungibles between parties comprising:

- a matching engine for matching buy/sell orders, relating to fungibles, input into the system by parties with counterparty sell/buy orders, relating to fungibles, input into the system; and
- a credit store for storing credit limits assigned by parties for trades with counterparties on the system, wherein the credit limits are checked before matched orders are executed as a deal to ensure that there is sufficient credit for the deal;

wherein the credit engine comprises a credit adjuster for varying the credit available to a party for further trades by the amount of an executed deal, the amount of available credit being varied in an opposite direction for a buy deal to a sell deal.

64. A trading system for trading instruments between parties comprising:

- a credit store for storing credit limits for counterparties trading instruments on the system, the credit limits being indicative of the credit available to a party for trades with other parties on the system;
- a matching engine for matching buy and sell orders input into the system by parties for execution of trades; wherein prior to execution of a trade a credit check is made to ensure that at least one of the matched parties has sufficient available credit to execute the trade; and
- a credit manager for adjusting the amount of credit available to the at least one party for trades by the amount of an executed trade, the amount of remaining credit being adjusted following a buy trade in the opposite direction to the adjustment following a sell trade.

* * * * *